United States Patent [19]

Bergman

[11] 4,444,541
[45] * Apr. 24, 1984

[54] AIR FLOAT POWER TRANSLATION AND ROTATION SYSTEM

[76] Inventor: Raymond A. Bergman, 107 E. Second St., Minster, Ohio 45865

[*] Notice: The portion of the term of this patent subsequent to Nov. 3, 1998 has been disclaimed.

[21] Appl. No.: 332,106

[22] Filed: Dec. 18, 1981

[51] Int. Cl.³ ............................................. B23Q 7/00
[52] U.S. Cl. ................................. 414/676; 198/375; 269/20; 269/309; 414/744 R
[58] Field of Search .................. 414/676, 744 R, 749, 414/750, 903; 269/20 R, 73, 309, 310; 198/375, 376, 472

[56] References Cited

U.S. PATENT DOCUMENTS

| | | | |
|---|---|---|---|
| 589,724 | 9/1897 | Hess | 104/36 |
| 3,807,035 | 4/1974 | Moorman | |
| 4,058,885 | 11/1977 | Bergman | |
| 4,298,307 | 11/1981 | Bergman | 414/676 |
| 4,354,796 | 10/1982 | Bergman | 414/676 |
| 4,373,840 | 2/1983 | Miller | 198/472 X |

FOREIGN PATENT DOCUMENTS 950272 2/1964 United Kingdom ................ 414/749

*Primary Examiner*—Leslie J. Paperner
*Attorney, Agent, or Firm*—Jeffers, Irish & Hoffman

[57] ABSTRACT

A power translation and rotation apparatus for an air float fixture support system of the type including a table having an upwardly facing upper surface adapted for supporting a workpiece fixture thereon, and a pressurized fluid system for supplying a cushion of pressurized air or other fluid between the surface of the table and the workpiece fixture so as to floatingly support the fixture thereon for virtually friction-free movement. The power translation and rotation apparatus generally comprises a single pin translatably and rotatably mounted within the table and having a portion thereof extending upwardly from the table surface, and motor-gear or hydraulic direct drive arrangements within the table for translating and rotating the pin about respective axes normal to the upper surface of the table. The pin is suitably shaped so that it is keyed to an opening in the lower surface of the fixture thereby causing the fluid supported fixture to be translated and rotated in unison with the pin. In a preferred form of the invention, the pin is provided with a square-shaped upper end having a side length equal to the width of the slot, and is provided with a retractable inner pin, with the outer pin also being retractable. The invention is also adaptable to a mechanical conveyor system so that the pin can engage a fixture on the conveyor, and translate and rotate it on to the main portion of the table in the vicinity of the machine tool.

32 Claims, 10 Drawing Figures

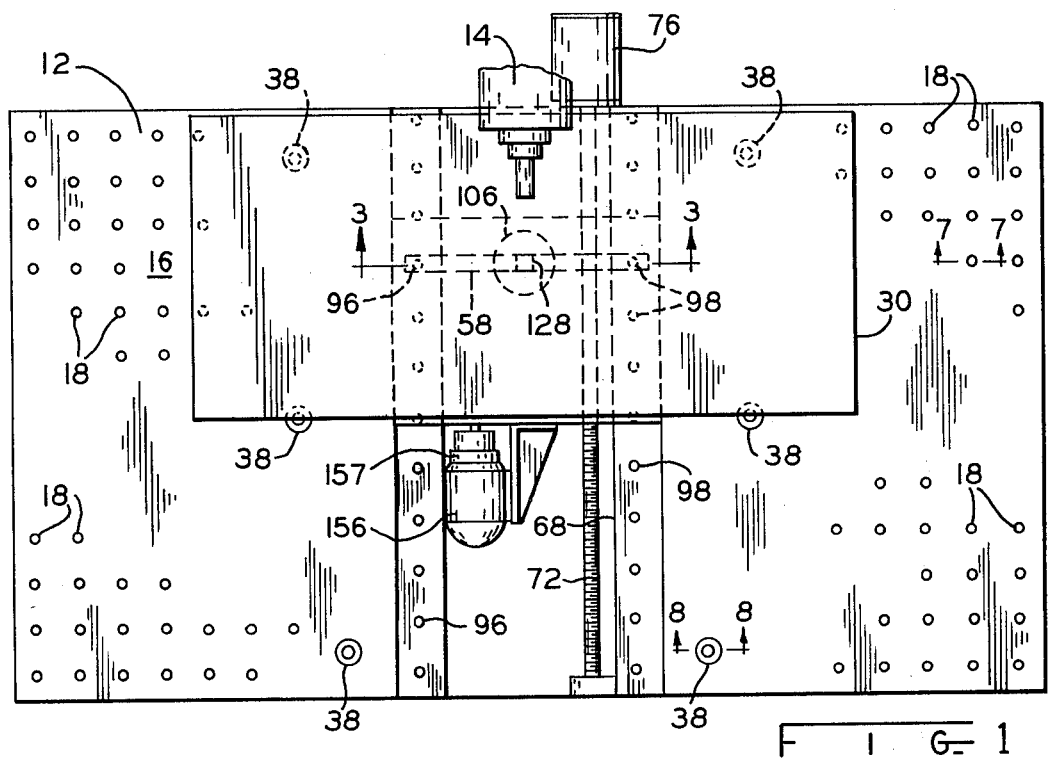
FIG. 1
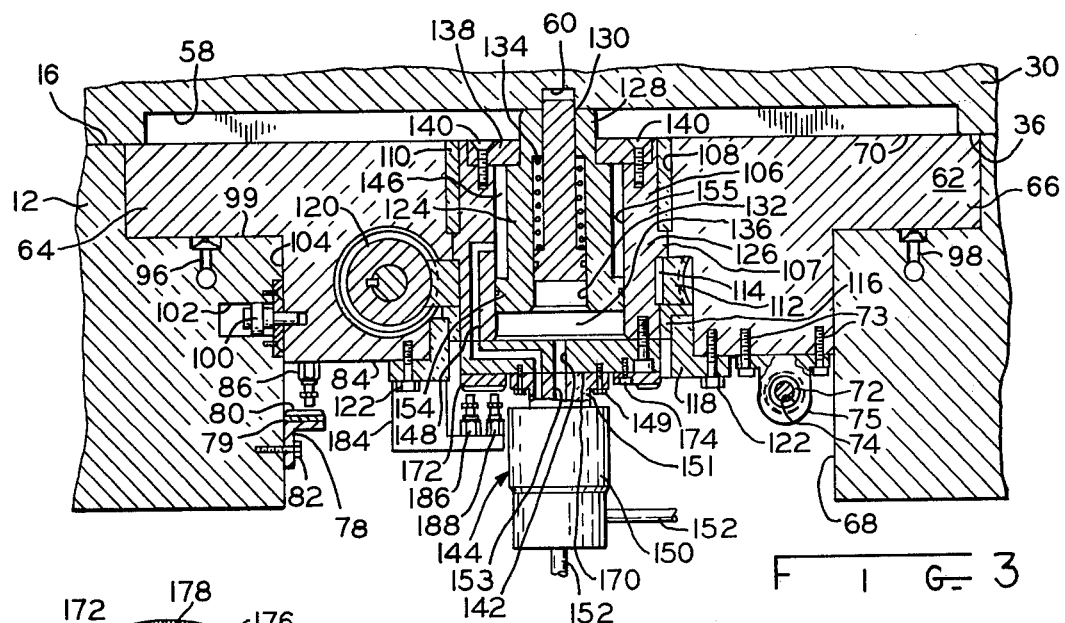
FIG. 3
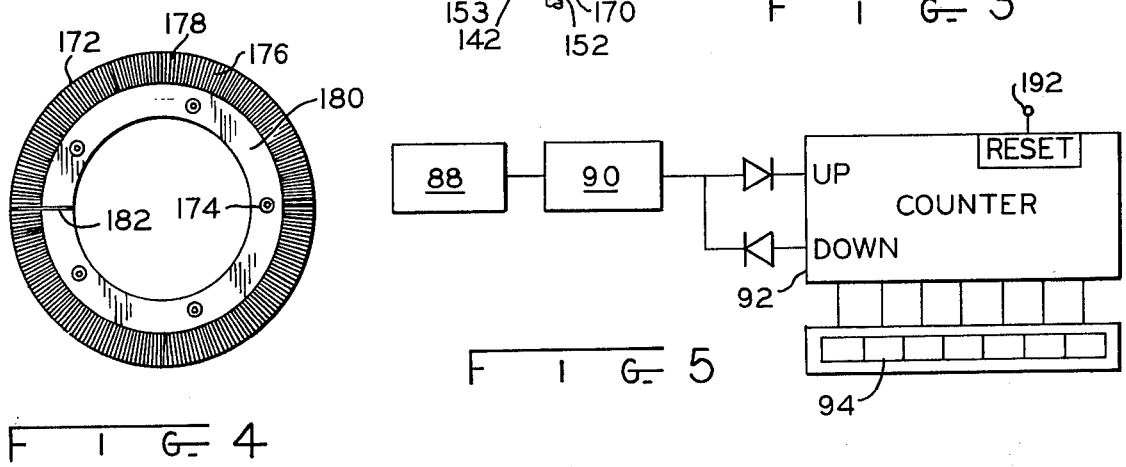
FIG. 4
FIG. 5

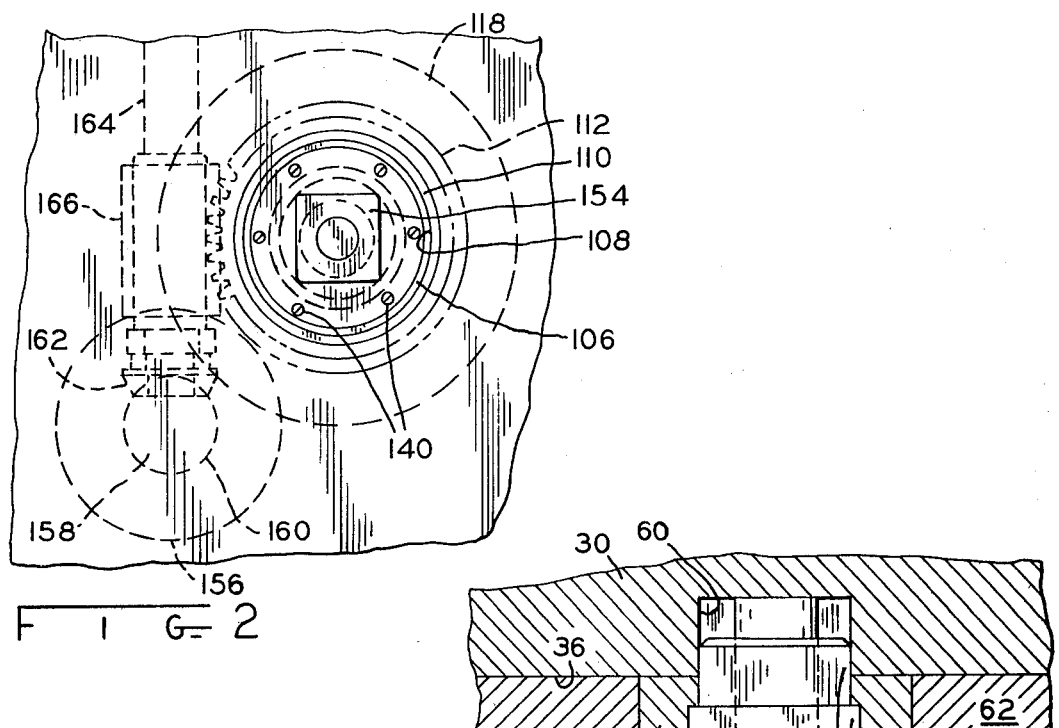
FIG. 2
FIG. 6
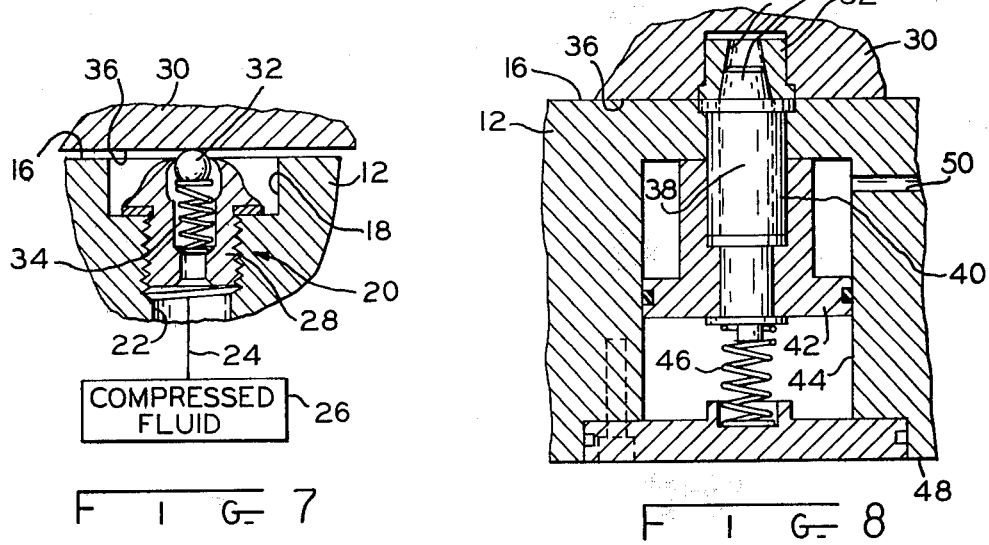
FIG. 7
FIG. 8
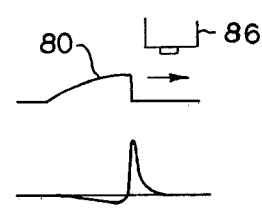
FIG. 9
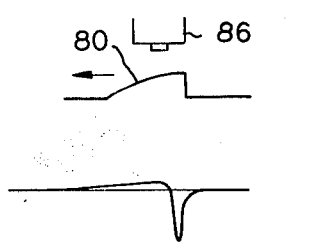
FIG. 10

AIR FLOAT POWER TRANSLATION AND ROTATION SYSTEM

BACKGROUND OF THE INVENTION

The present invention relates to a pressurized fluid fixture support system for machine tool and other environments, and in particular to a power translation and rotation apparatus wherein the fixture may be automatically translated from one position to another on the table and automatically rotated about one or more selected centers of rotation on the table.

The machining of large workpieces often involves very difficult positioning and repositioning of the workpiece when various portions thereof are machined. In many cases, it is necessary to use hoists for elevating and moving the workpiece both to and from the machine tool table, and on the table itself where repositioning is necessary for sequential machining steps.

In order to overcome these problems an air-float system, wherein the workpiece is mounted to a fixture which in turn is supported on a cushion of pressurized air, has been developed. This system is described in detail in U.S. Pat. No. 4,058,885 in the name of Raymond A. Bergman, which patent is incorporated herein by reference. In the system, a table is provided with fluid passages and a plurality of fluid outlets distributed over the surface of the table so that a cushion of pressurized air may be provided underneath the workpiece fixture. By virtue of the fluid pressure cushion, substantially friction-free movement of the fixture on the table is possible, thereby allowing positioning and repositioning to be accomplished by a single operator without the need for hoisting equipment.

However, a major inconvenience and a time consuming procedure exists with the above system in that the operator must manually translate and rotate the fixture relative to the machine tool. This inconvenient and time consuming procedural step is partially remedied by an air float power translation system wherein the workpiece is engaged by a retractable pin within the air-float table, and then translated to a new position by means of a mechanical driving system such as a hydraulic ram or feed screw. This system is described in detail in U.S. application Ser. No. 966,072 by Raymond A. Bergman, filed Dec. 4, 1978, now U.S. Pat. No. 4,354,796, the disclosure of which is hereby incorporated by reference. Specifically, U.S. application Ser. No. 966,072 provides a power translation apparatus comprising an elongated slot in the table surface, a carriage mounted in the table below the table surface for reciprocal movement parallel to the table surface along a slot, a translation pin member carried by the carriage and protruding through the slot above the surface of the table, means for selectively retracting the pin member below the table surface, and a driving mechanism for translating the carriage and pin member carried thereby along the slot.

The remaining problem above, the requirement of manually rotating the fixture, is overcome by an air float power rotation system wherein the workpiece fixture may be automatically rotated about one or more selected centers of rotation on the table. The air float power rotation system has been fully described in U.S. Pat. No. 4,298,307, the disclosure of which is hereby incorporated by reference. Specifically, U.S. Pat. No. 4,298,307 provides a table having a plurality of retractable locating pins positioned at precisely determined locations, and which selectively interengage with corresponding openings in the lower surface of the workpiece fixture so as to accurately lock the fixture in place. Preferably, the pin is square-sided in shape and engages a complementary shaped opening in the lower surface of the fixture and means are provided in the table for turning the square-sided pin about a vertical axis, whereby the fixture, which is supported on a cushion of pressurized fluid, is rotated in unison with the pin to the desired location. Furthermore, in order to provide for the rotation of the fixture about different centers of rotation, as would be the case where fixtures of different sizes are used, a plurality of automatically rotated pins may be provided in the table.

As described above, each of the references individually overcomes a portion of the total requirement of manually translating and rotating a fixture on a table for machine tooling. Consequently, each has its own individual disadvantage in that U.S. application Ser. No. 966,072 requires manually rotating the fixture, while U.S. Pat. No. 4,298,307 requires manually translating the fixture.

SUMMARY OF THE INVENTION

The present invention simultaneously overcomes both problems of manual translation and manual rotation by providing an air float power translation and rotation apparatus. Specifically, the present invention provides a support table having a generally flat upper surface, a workpiece fixture having a lower surface with an opening therein and supported on the table upper surface, means for supplying a cushion of fixture supporting pressurized fluid to the table upper surface so that the workpiece fixture is floatingly supported thereon, and a pin translatably and rotatably mounted within the table and having a portion thereof extending upwardly from the table surface and receivable within the fixture opening so that the fixture may be automatically translated and rotated on the cushion of air above the table surface. When positioned at the desired location, the fixture may be clamped in place by any one of a number of conventional clamping devices.

In order to automatically translate the fixture along the table surface, the present invention provides a carriage for carrying the pin therein and movable along a slot within the table surface. Fluid means are provided for translating the carriage in order to precisely position the fixture on the table surface.

To automatically rotate the fixture about a desired center of rotation upon the table surface, the present invention provides a square-shaped pin carried on the translatable carriage, which is also rotatable within the table slot. The square-shaped pin is received within a square-shaped opening in the lower surface of the fixture so that, upon providing a fluid cushion between the fixture and the table, the fixture may be rotated and translated along the table surface Another embodiment of the present invention, which provides greater flexibility in translational and rotational movement, includes having a slot in the lower surface of the fixture, with the slot having a plurality of downwardly facing openings in its upper surface. The square-shaped pin is also provided with an inner pin which may be extended upwardly to engage an opening within the fixture slot. In this embodiment, the fixture may not only be translated along the table slot and rotated about any position along the table slot, but may also be translated along the fixture slot and rotated about any point along the fixture slot.

It is an object of the present invention to provide an air float power translation and rotation apparatus wherein a workpiece fixture may be translatably and rotatably positioned without operator manual intervention, thereby enabling the use of a numerical control system.

Another object of the present invention is to provide an air float power translation and rotation apparatus wherein a workpiece fixture may be automatically translated and rotated by a single pin assembly.

A further object of the present invention is to provide an air float power translation and rotation system wherein any differently sized workpiece fixture may be automatically translated and rotated for machining.

BRIEF DESCRIPTION OF THE DRAWINGS

The above-mentioned and other features and objects of this invention, and the manner of attaining them, will become more apparent and the invention itself will be better understood by reference to the following description of an embodiment of the invention taken in conjunction with the accompanying drawings, wherein:

FIG. 1 is a plan view of an embodiment of an air float power translation and rotation system according to the present invention;

FIG. 2 is an enlarged plan view of a rotation pin of an embodiment of the present invention;

FIG. 3 is a sectional view taken along line 3—3 of FIG. 1 and viewed in the direction of the arrows;

FIG. 4 is a plan view of a circular groove plate of an embodiment of the present invention;

FIG. 5 is a diagrammatic view of a numerical control system of an embodiment of the present invention;

FIG. 6 is a sectional view of a pin of an embodiment of the present invention;

FIG. 7 is a sectional view taken along line 7—7 of FIG. 1 and viewed in the direction of the arrows;

FIG. 8 is a sectional view taken along line 8—8 of FIG. 1 and viewed in the direction of the arrows;

FIG. 9 illustrates the wave form of a magnetic pick-up device moving in one direction across a gear tooth; and FIG. 10 illustrates the wave form of a magnetic pick-up device moving in an opposite direction across a gear tooth.

DETAILED DESCRIPTION

Referring now to the drawings, there is illustrated in FIG. 1 an air float machine tool table 12 positioned in front of a machine tool head 14. Table 12 is generally of a type described in the aforementioned U.S. Pat. No. 4,058,885 and includes a planar upper surface 16 provided with a plurality of openings 18 distributed over surface 16 of table 12 and having ball check valves 20 installed therein (FIG. 7).

With reference to FIG. 7, table 12 is provided with a network of passageways 22 communicating with a supply conduit 24 connected to a control valve (not shown) with a supply of fluid under pressure 26, such as air supplied from an air compressor. The upper end of each passageway 22 is closed by valve 20 comprising a body 28 threaded into the upper end of passageway 22, the top thereof being disposed below the level of table surface 16 so that no obstructions are presented to workpiece fixture 30 supported thereon. A steel ball 32 is captured and seated within body 28 and urged into a closed and seated position by spring 34. Ball 32 projects upwardly beyond surface 16 a slight distance so that it will be contacted and unseated by fixture 30 as it passes thereover. This will permit pressurized fluid to flow through body 28 to the surface 16 of table 12 thereby establishing a fluid film between upper surface 16 of table 12 and lower surface 36 of fixture 30. The cushion of air will floatingly support fixture 30 so that the fixture-workpiece combination can be easily moved about on table 12. It is preferred that fixture 30 be in the form of a suitably dimensioned steel or cast iron plate having a generally flat lower surface 36 and means on the upper surface thereof so that the workpiece (not shown) may be clamped or otherwise secured thereto.

Table 12 is also equipped with a plurality of locating pins 38, which are located in accurately determined positions on table 12 so that fixture 30 may be precisely located for machining of the workpiece. Referring to FIG. 8, locating pin 38 is slidably received within bushing 40 and connected to piston 42. Piston 42 reciprocates within bore 44 and is biased upwardly by spring 46, bore 44 being closed at its lower end by vented plate 48. In order to retract pin 38, fluid pressure is admitted to bore 44 through passageway 50. The lower surface 36 of fixture 30 is provided with a plurality of accurately located bushings 52 having tapered inner surfaces 54 adapted for the seating of the tapered upper end 56 of locating pins 38.

The location of bushings 52 and locating pins 38 will depend upon the desired positions in which fixture 30 is to be accurately located for machining of the workpiece mounted thereon. It will be appreciated that only two locating pins 38 and two locating bushings 52 are needed to accurately locate the fixture 30 in any given position. Fixture plate 30 may be clamped in place by any conventional clamping device. For example, table 12 may be provided with bayonet clamp openings (not shown) adapted for the insertion of bayonet clamps of the type described in U.S. Pat. No. 4,143,868 or with a T-clamp system described in U.S. Pat. No. 4,275,983.

With reference to FIGS. 1 and 3, fixture 30 will be seen to comprise a rectangular steel plate having a slot 58 in its lower surface 36, with hole 60 located at the center thereof. Although only one hole 60 is illustrated in FIG. 3, a plurality of similar holes may also be distributed along the length of slot 58. The upper surface of fixture 30 is adapted to have a workpiece (not shown), such as a part to be drilled or milled, clamped or bolted thereto. Any number of tapered bushings 52 may be provided on the underneath surface 36 of fixture 30, depending on the variety of locating positions which are necessary for the particular machine tool station.

The translation structure of the air float power translation and rotation apparatus according to the present invention, which is shown in detail in FIGS. 1 and 3, comprises a cast iron carriage 62 having support sections 64 and 66 received within channel 68 of table 12 so that it is capable of reciprocal sliding movement within table 12 in a direction parallel to the upper surface 16 of table 12. It will be appreciated that upper surface 70 of carriage 62 is substantially flush with the upper surface 16 of table 12 so that it will not interfere with the free movement of fixture 30 thereon. Carriage 62 is received within channel 68, which is shaped to generally conform to the shape of carriage 62 and extends the transverse length of table 12.

Carriage 62 is reciprocated by means of a feed screw 72, which passes through and is threadedly engaged with a plurality of threaded bores 74 within a plurality of brackets 75 in the lower portion of carriage 62. Brackets 75 are connected to carriage 62 by fasteners such as screws 73. As feed screw 72 is rotated clockwise and counterclockwise by electric motor 76, carriage 62 will be retracted and advanced in channel 68.

An alternate embodiment for reciprocating carriage 62 comprises a hydraulic ram assembly as disclosed in U.S. application Ser. No. 966,072 and which has earlier been incorporated by reference herein. In the preferred embodiment, the feed screw 72 is used to reciprocate carriage 62 because it allows greater precision in positioning carriage 62 along channel 68.

In reciprocating carriage 62 along channel 68, it may be important to be able to precisely measure the position of carriage 62 carrying a workpiece thereon along channel 68. This is accomplished by mounting an inverted L-shaped bracket 78 to a side of channel 68 as depicted in FIG. 3. Bracket 78 extends the length of channel 68 and has a rack 79 comprising a plurality of teeth 80 disposed thereon, which are preferably made of a ferrous material. Bracket 78 is mounted to channel 68 by a plurality of screws 82. Mounted to lower surface 84 of carriage 62 is a magnetic pick-up 86, which extends downwardly from lower surface 84 and terminates just slightly above teeth 80 on rack 79. Referring to FIGS. 9 and 10, magnetic pick-up 86 generates a magnetic flux, which is interrupted as magnetic pick-up 86 moves along teeth 80 during the reciprocation of carriage 62 by feed screw 72. By forming teeth 80 in an irregular shape, as illustrated in FIGS. 9 and 10, a different transient voltage is generated depending upon the direction of movement of magnetic pick-up above teeth 80. For example, in FIG. 9 magnetic pick-up 86 is moving left to right and generates an impulse as illustrated as it passes over the sloping shoulder of tooth 80, which then abruptly terminates. In moving from right to left as depicted in FIG. 10, magnetic pick-up 86 has its magnetic flux abruptly interrupted by tooth 80, thereby generating a negative impulse. Teeth 80 are not limited to the shape shown in FIGS. 9 and 10, but may have any irregular shape so that the magnetic flux of magnetic pick-up 86 is interrupted so as to generate a different impulse as the pick-up moves either left to right or right to left.

Upon teeth 80 interrupting the magnetic flux of magnetic pick-up 86, the generated signals are received by a pick-up 88 (FIG. 5). Thereafter the signals are fed to a pulse shaper 90 and then to counter 92 for visual presentation by display 94 or to an automatic feedback control which will stop the carriage at a preset position. Display 94 presents the precise location of carriage 62 along channel 68, the accuracy of which is dependent upon the number of teeth 80 on bracket 78.

Magnetic pick-up 86 may be of any type able to generate a signal described above, such as AIRPAX electromagnetic pick-up model 725-0001 manufactured by Airpax Electronics of Fort Lauderdale, Fla.

To assist feed screw 72 in reciprocating carriage 62 along table channel 68, a plurality of ball check valves 96, 98 are disposed within interior surface 99 of carriage 62, upon which carriage support sections 64, 66 are placed. Several preset positions of carriage 62 can be made by means of a horizontal locating pin 100, which is receivable within a plurality of horizontal openings 102 within wall 104 of channel 68.

Referring to FIGS. 2 and 3, the rotation structure of the air float power translation and rotation apparatus according to the present invention comprises a cylinder 106 rotatively received within opening 108 for rotation about a vertical axis, and including insert 110. Cylinder 106 is maintained vertically within opening 108 and flange 107 is supported on ring gear 112. Cylinder 106 is keyed to ring gear 112 by key 114, and this assembly is held in place by insert 116 and flange retaining ring 118. Gear 120 drives ring gear 112, and screws 122 hold retaining ring 118 in place. Inserts 110, 116 serve as bearings to permit free rotation of cylinder 106 within opening 108.

Outer pin 124 includes a cylinder lower portion 126 and a square upper portion 128, the latter having a side length equal to the width of slot 58. Inner pin 130 is reciprocally received within bore 132 of outer pin 124, and a compression coil spring 134 causes inner pin 130 to retract unless chamber 136 is pressurized. Plate 138 connected to cylinder 106 by screws 140 serves as the upper stop for outer pin 124. Fluid pressure is conveyed to chamber 136 through passageway 142 from rotary dual passage union device 144. When hydraulic or air pressure is admitted to chamber 136, outer pin 124 and inner pin 130 will be projected upwardly with outer pin 124 being received within slot 58 and inner pin 130 being received within hole 60 in slot 58. If it is desired to retract the inner and outer pins 124, 130 fluid pressure is admitted to chamber 146 through fluid passageway 148. With outer pin 124 received in slot 58, as cylinder 106 rotates, fixture 30 will rotate in unison therewith if it is supported on a cushion of pressurized air. The rotary dual passage union device 144 may be a commercially available device, for example the Deu-Plex union manufactured by Deublin Company of Northbrook, Ill. and comprises a housing 150 to which fluid lines 152 are attached, and a rotor 151 having a passageway 153 connecting with hydraulic passageway 142. Rotor 151 is mounted on the bottom of cylinder 106 by screws 149. Rotor 151 is capable of rotating relative to housing 150 without interrupting the fluid supply to chamber 136. When fluid under pressure is introduced into chamber 136, piston 154 will be forced upwardly within bore 155, thereby compressing spring 134 so as to cause outer pin 124 to project upwardly into slot 58. If inner pin 130 is positioned beneath holes 60 in slot 58, then it also will project upwardly as illustrated in FIG. 3.

The driving system for the rotation of cylinder 106 comprises an electric motor 156 drivingly connected to an electric clutch 157 (FIG. 1), the latter being drivingly connected to bevel gear 158 through shaft 160 (FIG. 2). Bevel gear 158 intermeshes with a second bevel gear 162, which is keyed to shaft 164. Worm gear 166 is also keyed to shaft 164 and is in intermeshing engagement with ring gear 112. By this arrangement, ring gear 112 is driven by motor 156 and the intermediate gear train and, by virtue of its being keyed to cylinder 106, will cause rotation of cylinder 106 and outer pin 124. Motor 156 may be of the reversible type so that rotation in either direction is possible.

Once fixture 30 is positioned with square outer pin 128 received in slot 58, it can be rotated to any desired position by establishing cushion of pressurized air between lower surface 36 of fixture 30 and upper surface 16 of table 12, and activating electric clutch 157 so that cylinder 106 begins to rotate about a vertical axis substantially normal to surface 16 of table 12. The measurement of rotation of cylinder 106 may be accomplished in a manner similar to the measurement of translational movement of carriage 62 along channel 68. Specifically, and referring to FIGS. 3 and 4, cylinder bottom surface 170 has mounted thereon an annular gear 172. Gear 172 has an outer ring 176 of teeth 178 disposed along its bottom surface, and an inner ring 180 having a single tooth 182 disposed on its lower surface. Gear 172 is mounted to cylinder bottom surface 170 so that teeth 178 and single tooth 182 are downwardly disposed therefrom. An L-shaped bracket 184 is mounted on the lower surface of carriage 62 in a manner similar to bracket 78, and has two magnetic pick-ups 186, 188 upwardly disposed therefrom such that magnetic pick-up 186 is just below teeth 178 of outer ring 176 and magnetic pick-up 188 is just below single tooth 182 on inner ring 180. As cylinder 106 rotates, gear 172 rotates in unison with it, thereby causing teeth 178 and tooth 182 to pass over magnetic pick-ups 186, 188. Teeth 178 and single tooth 182 are similar in shape to teeth 80 so that a signal is generated as depicted in FIGS. 9 and 10. The direction of rotation of cylinder 106 is determined in a manner similar to the reciprocal movement of carriage 62 within channel 68. For example, clockwise rotation of cylinder 106 may cause a signal to be generated similar to FIG. 9, while counter clockwise movement of cylinder 106 may generate a signal similar to FIG. 10 by using a counter like counter 92. The degree of rotation of cylinder 106 is then displayed by counter 92 on display 94. To prevent the display of rotation from exceeding 360° upon multiple rotation of cylinder 106 in one direction, single tooth 182 creates a reset signal upon passing over magnetic pick-up 188 and which is received by pick-up 190 (FIG. 5) so that counter 92, which is connected to reset input 190 and display 94, may reset display 94 to zero degrees rotation upon a complete revolution of cylinder 106. In this manner, the precise angular position of cylinder 106 relative to carriage 62 may be determined.

Although outer pin 124 has been shown and described as being square, any shape whereby it can be keyed to slot 58 or another suitable opening in the lower surface 36 of fixture 30 can be used as long as the required keying between the pin and fixtures is accomplished. For example, a hexagonal pin and a square-sided slot would also work, although the degree of mechanical interlocking between the pin and slot would not be as great as in the case where a square slot is used. Furthermore, the outer pin could be rectangular if greater interlocking strength is desired.

In operation, the invention permits a single outer pin 124 and inner pin 130 to both translate and rotate a fixture 30 upon table 12 when a cushion of pressurized air is disposed therebetween. In addition, because of a multiplicity of holes 60 in slot 58 of fixture 30, fixture 30 may be rotated about a multiplicity of centers in order to present different sides of an irregularly-shaped workpiece to a stationary machine tool 14.

FIG. 6 illustrates an alternate embodiment of the present invention wherein similar elements have been given identical reference numerals. Fixture plate 30 has only a square-shaped hole 60 disposed through its lower surface 36, thereby dispensing with slot 58. A single pin 200 is provided within cylinder 106 and has a square-shaped upper portion 202 receivable within hole 60 of fixture 30. Upon pin upper portion 202 being received within hole 60, fixture 30 and the workpiece thereon may be translated across table 12 as earlier described, however, since slot 58 has been eliminated, fixture 30 may be rotated only about a single fixture center defined by hole 60.

Regardless of the embodiment of the present invention which is used, whether it be the embodiment of fixture 30 having a slot 58 or only a single hole 60, the embodiments or any variations thereof may be readily adapted to remove a workpiece from a conveyor belt system as disclosed in aforementioned U.S. application Ser. No. 966,072. By so adapting the invention to a conveyor system, a complete hands-off machine tooling operation is possible by use of a numerical control system. Additionally, fixture 30 need not have any predetermined dimensions in order to be adaptable to table 12, thereby allowing any number of differently sized workpieces to be handled by the invention for machine tooling. It is believed that the present invention will have significant application to pallet changes for automatic machine tools.

While this invention has been described as having specific embodiments, it will be understood that it is capable of further modifications. This application is therefore intended to cover any such variations, uses, or adaptations of the invention following the general principles thereof and including such departures from the present disclosure as come within known or customary practice in the art to which the invention pertains and fall within the limits of the appended claims.

What is claimed is:

1. A pressurized fluid support system comprising:
   a support table having a generally flat upper surface and being adapted for supporting a workpiece fixture thereon,
   means for supplying a cushion of fixture supporting pressurized fluid to said upper surface of said support table whereby a workpiece fixture may be floatingly supported thereon,
   keying element means translatably and rotatably mounted within said table and having a portion thereof extending upwardly from said table upper surface, said portion of said keying element means extending from said table upper surface having a non-circular cross-sectional shape within a plane parallel to said table upper surface whereby said keying element means is capable of keying to an overlying workpiece fixture,
   means within said table for translating said keying element means therealong, and
   means within said table for rotating said keying element means about an axis normal to said table upper surface.

2. The system of claim 1 including a workpiece fixture having a lower surface supported on said table upper surface on the cushion of pressurized fluid, and including an opening in said lower surface keyed to said keying element means so that said fixture may be translated and rotated by said keying element means.

3. The system of claim 2 wherein said fixture opening is square-shaped and said keying element means includes a square-shaped upper portion receivable within said square-shaped fixture opening.

4. The system of claim 1 wherein said keying element means comprises a pin mounted for retraction to a position flush with or below said table upper surface.

5. The system of claim 4 including fluid means for operating said pin between a retracted and an extended position.

6. The system of claim 1 wherein said translating means comprises:
   an elongated first slot in said table surface, a carriage being mounted in said table below said table upper surface and carrying said keying element means thereon for reciprocal movement parallel to said table upper surface along said first slot, and drive means for translating said carriage and said keying element means along said first slot.

7. The system of claim 6 wherein said rotating means comprises a motor and a gear train operably connected between said motor and said keying element means carried on said carriage.

8. The system of claim 7 wherein said translating drive means is a fluid actuated ram connected to said carriage.

9. The system of claim 7 wherein said translating drive means is a feed screw threadedly connected to said carriage.

10. The system of claim 9 wherein said carriage is slidably received in a longitudinal second slot within said table and generally below and coextensive with said first slot.

11. The system of claim 10 wherein said keying element means comprises a retractable pin having a portion thereof extending upwardly from said table surface, said pin portion having a non-circular cross-section within a plane parallel to said table upper surface, and including a workpiece fixture having a lower surface supported on said table upper surface on the cushion of pressurized fluid and a non-circular opening in said lower surface thereof with a cross-sectional shape substantially the same as said pin portion, and fluid means for selectively retracting said pin below said table upper surface, whereby said pin is capable of keying to said fixture for translating and rotating said fixture on said table upper surface.

12. The system of claim 11 further including means for measuring the position of said carriage within said second slot.

13. The system of claim 12 further including means for determining the angular position of said pin of said keying element means relative to said carriage.

14. The system of claim 13 wherein said measuring means comprises:

an elongated rack being longitudinally secured to one of said table and carriage and including a plurality of irregularly-shaped teeth, first mean attached to the other of said table and carriage and adjacently spaced apart from said teeth for sensing relative movement of said teeth and said sensing means as said carriage translates within said second slot, and means connected to said sensing means for displaying the position of said carriage within said second slot.

15. The system of claim 14 wherein said determining means comprises:

an annular plate being secured to one of said keying element means and said carriage and concentric with said pin, a plurality of irregularly-shaped teeth being positioned upon said annular plate, a second sensing means being attached to the other of said carriage and keying element means and adjacently spaced apart from said annular plate teeth for sensing relative rotational movement between said teeth on said plate and said second sensing means, and means connected to said second sensing means for indicating the angular position of said pin.

16. The system of claim 15 further including:

an irregularly-shaped single tooth being positioned on said plate, a third sensing means being attached to one of said carriage and keying element means and adjacently spaced apart from said tooth for sensing relative rotational movement between said single tooth and said third sensing means, and means connected to said third sensing means and to said indicating means for resetting the indicating means to a datum upon a complete revolution of said pin.

17. The system of claim 16 wherein said first sensing means, second sensing means, and third sensing means are electromagnetic devices capable of generating various impulses upon having their magnetic field interrupted by said irregularly-shaped teeth.

18. A pressurized fluid support system comprising:

a support table having a generally flat upper surface, a workpiece fixture having a downwardly facing lower surface on said table upper surface, said fixture having an elongated slot in said lower surface, said slot having a downwardly facing opening in its upper surface, means for supplying a cushion of pressurized fluid between said fixture and table surfaces so as to floatingly support said fixture for movement over said table upper surface, keying element means translatably and rotatably mounted within said table and having a portion thereof extending upwardly from said table upper surface, said portion having a non-circular cross-sectional shape, means within said table for translating said keying element means therealong, and means within said table for rotating said keying element means, whereby said fixture may be floatingly translated and rotated upon said table upper surface.

19. The system of claim 18 wherein said keying element means comprises a pin having a non-circular cross-sectional shape and at least two substantially flat sides adapted to engage longitudinal sides of said fixture slot, and an inner pin mounted within said pin for vertical movement therein and receivable within said slot opening of said fixture.

20. The system of claim 19 wherein said translating means comprises an elongated first slot in said table surface, a carriage being mounted in said table below said table upper surface and carrying said pins thereon for reciprocal movement parallel to said table upper surface along said first slot, and drive means for translating said carriage and said pins along said first slot.

21. The system of claim 20 wherein said rotating means comprises a motor and a gear train operably connected between said motor and said carriage.

22. The system of claim 21 wherein said pin is mounted within said carriage for vertical movement therein, and including means for fluidly actuating said pins to move vertically.

23. The system of claim 22 wherein said fluid actuating means comprises a piston and cylinder arrangement and rotating fluid union means for conveying fluid to said piston and cylinder arrangement.

24. The system of claim 23 wherein said carriage is slidably received in a longitudinal second slot within said table and generally below and coextensive with said first slot.

25. The system of claim 24 wherein said translating drive means is a feed screw threadedly connected to said carriage.

26. The system of claim 25 further including means for measuring the position of said carriage within said second slot.

27. The system of claim 26 further including means for determining the angular position of said pin of said keying element means relative to said carriage.

28. The system of claim 27 wherein said measuring means comprises:
an elongated rack being longitudinally secured to one of said table and carriage and including a plurality of irregularly-shaped teeth,
first means attached to the other of said table and carriage and adjacently spaced apart from said teeth for sensing relative movement of said teeth and said sensing means as said carriage translates within said second slot, and
means connected to said sensing means for displaying the position of said carriage within said second slot.

29. The system of claim 28 wherein said determining means comprises:

an annular plate being secured to one of said keying element means and said carriage and concentric with said pin,
a plurality of irregularly-shaped teeth being positioned upon said annular plate,
a second sensing means being attached to the other of said carriage and keying element means and adjacently spaced apart from said annular plate teeth for sensing relative rotational movement between said teeth on said plate and said second sensing means, and
means connected to said second sensing means for indicating the angular position of said pin.

30. The system of claim 29 further including:
an irregularly-shaped single tooth being positioned on said plate,
a third sensing means being attached to one of said carriage and keying element means and adjacently spaced apart from said tooth for sensing relative rotational movement between said single tooth and said third sensing means, and
means connected to said third sensing means and to said indicating means for resetting said indicating means to a datum upon a complete revolution of said pin.

31. The system of claim 30 wherein said first sensing means, second sensing means, and third sensing means are electromagnetic devices capable of generating various impulses upon having their magnetic fields interrupted by said irregularly-shaped teeth.

32. The system of claim 31 including a plurality of openings in said fixture slot and engageable by said inner pin.

* * * * *